United States Patent [19]

Ericsson

[11] Patent Number: 4,485,447

[45] **Date of Patent: * Nov. 27, 1984**

[54] METHOD AND ARRANGEMENT FOR REGISTRATION OF PRINT ON A MATERIAL

[75] Inventor: Sylve J. D. Ericsson, Tumba, Sweden

[73] Assignee: Svecia Silkscreen Maskiner AB, Norsberg, Sweden

[ * ] Notice: The portion of the term of this patent subsequent to Oct. 7, 1997 has been disclaimed.

[21] Appl. No.: 401,656

[22] Filed: Jul. 26, 1982

Related U.S. Application Data

[63] Continuation of Ser. No. 142,883, Apr. 22, 1980, abandoned.

[30] Foreign Application Priority Data

Apr. 23, 1979 [SE] Sweden .............................. 7903516

[51] Int. Cl.$^3$ .............................. G06F 15/46

[52] U.S. Cl. .............................. 364/469; 101/129; 101/DIG. 12; 364/519

[58] Field of Search ............ 101/115, 126, 129, 127.1, 101/DIG. 12; 33/184.5; 355/40-41; 364/469, 519, 174

[56] References Cited

U.S. PATENT DOCUMENTS

| | | | |
|---|---|---|---|
| 2,375,451 | 5/1945 | Waters | 101/D12 |
| 3,498,711 | 3/1970 | Ables | 101/D12 |
| 3,677,146 | 7/1972 | Nielsen | 101/D12 |
| 3,998,156 | 12/1976 | Zimmer | 101/115 |
| 4,084,505 | 4/1978 | Ichinose | 101/115 |
| 4,223,453 | 9/1980 | Meyer | 101/D12 |
| 4,226,181 | 10/1980 | Ericsson | 101/129 |
| 4,245,555 | 1/1981 | Alston | 101/D12 |

FOREIGN PATENT DOCUMENTS

| | | | |
|---|---|---|---|
| 2819400 | 11/1978 | Fed. Rep. of Germany | 101/D12 |
| 908431 | 10/1962 | United Kingdom | 101/D12 |
| 1564003 | 4/1980 | United Kingdom | 101/D12 |

*Primary Examiner*—Clyde I. Coughenour
*Attorney, Agent, or Firm*—Burns, Doane, Swecker & Mathis

[57] ABSTRACT

A reference pattern is registered on a table, separate from a printing machine, where it is scanned and its position recorded. A material is then printed in the printing machine following which it is transferred to the registering table where its position is scanned and recorded. The recorded values are compared and the deviation used to adjust the position of one of the print, the material, the printing table or a registering arrangement for the print.

20 Claims, 7 Drawing Figures

METHOD AND ARRANGEMENT FOR REGISTRATION OF PRINT ON A MATERIAL

This application is a continuation of application Ser. No. 142,883, filed Apr. 22, 1980, now abandoned.

TECHNICAL RANGE OF THE INVENTION

The present invention relates to a method and an arrangement whereby it is possible to adjust a stencil or a pattern exactly, or in any case nearly exactly, relative to a reference pattern serving as the original, which is normally a print or pattern applied earlier. The invention is particularly advantageously applied to multi-colour printing, that is to say to printing where one and the same material is covered with several standard colours and where different colours are to be applied to one another with great accuracy.

Where the invention is used in a silkscreen printing machine, a relative displacement movement must be imparted either to the stencil, where it should be the only measure, or to the printing table by means of the registering means (stop or guide pin) or the registering means alone.

The invention, therefore, proposes a method and an arrangement whereby the position of a stencil can be adjusted relative to a printing table and a material placed on the latter which is intended to receive a print which corresponds to the pattern of the stencil. It is intended that the adjustment causes the pattern to be applied exactly (preferably within a tolerance range of 0.1 mm) to the material.

PRIOR STATE OF THE ART

Although a plurality of different types of printing machines are considered in the prior state of the art, at which the above-mentioned adjustment steps must be undertaken, the description of the prior state of the art, which is to follow, shall be limited to stencil printing machines.

Stencil printing machines are known in themselves in which the stencil is constructed as a cylinder and in which the table is constructed as an endless belt. It is here particularly important that, especially with multi-colour printing, the different colour dots are related to one another as exactly as possible.

Stencil printing machines have been known even earlier in which the stencil and its associated frame are firmly related to the support frame of the printing machine.

There are also stencil printing machines which have a stencil, in a frame, with a reciprocating movement and in which the printing table is firmly related to the support frame of the printing machine.

In general, in printing machines it is a prime objective that the allocated printing pattern on the material be placed exactly and in the exact position relative to a pattern, serving as the original, which was applied earlier to the material. In order to make this possible, it must be possible to evaluate the difference (discrepancy) between the previous pattern and the pattern applied, and to be able to take measures to compensate for this discrepancy. The measures taken can be one or several of the following:

(a) to change the position of the pattern relative to the material (by adjusting the frame of the stencil), (b) to change the position of the material relative to the pattern (by adjusting the registering means applied to the fixed printing table), or (c) to change the position of the material together with the printing surface relative to the pattern (by adjusting the position of the printing table and providing fixed registering means).

This is nearly always necessary with an adjustment before the pattern can attain its exact position on the material. This adjusting has proved to be complicated and, above all, time-consuming.

So that this adjustment can be made in a stencil printing machine with fixed stencil and a printing table with reciprocating movement, it has been known previously to apply a reference material to the registering means, such as a guide pin or stop, of the printing table in the feed position of the printing table, to apply a transparent material over the reference material, this transparent material being held by the same registering means, to move the printing table to the printing position and there to apply the pattern of the stencil to the transparent material. If the transparent material with the pattern of the stencil is now moved back again to the feed position, it becomes possible to establish visually if, and in this case by how much, the pattern of the stencil on the transparent material deviates from the desired position, that is to say the pattern of the reference material. In order to compensate for this deviation the pattern of the stencil is adjusted in relation to the material, since the material is assumed to be fixedly related via the registering means to a special position on the printing table.

In order to enable the stencil pattern to be adjusted, it has previously been proposed to hold the stencil in a first frame which, in turn, is held by but rotatably and displaceably arranged in a further frame. This further frame is fixed relative to the machine stand.

When the above-mentioned deviation has been established, it is necessary to adjust the first frame of the stencil relative to the other frame, this being effected by means of a plurality of setting devices. The setting devices are operated, however, "by instinct" and are set to such values that the stencil pattern can be assumed to be placed exactly on the material. After the setting devices have been operated, a further print is made on a new reference material in order to evaluate how far the setting approaches or departs from the desired exact setting. This setting work has been found to be extremely complicated, perhaps primarily because the setting is not only oriented in the "x" and "y" directions, that is to say at right-angle coordinates, but usually requires the stencil to be turned.

In order to reduce the above-mentioned adjusting time to the highest possible degree, a method and an arrangement have been proposed for adjusting the position of the stencil in relation to the printing table by utilizing a transparent material which is applied to the printing table over the reference pattern. When the stencil pattern is applied in this manner to the transparent material, a deviation occurs between the printed pattern and the reference pattern. This deviation may be compensated for and eliminated by moving the transparent material with the printed pattern until it matches the reference pattern and the movement performed is then imparted to the stencil and the frame supporting the stencil.

The method proposed above, and the arrangement related to the latter, requires of necessity a special printing table in which a rail, on which special registering means are mounted, can be displaced by means of setting elements. It is the intention that the adjustment value for the printing table associated with this setting element is to be transferred to the corresponding setting element in order to displace the frame in which the stencil is fixed in relation to the outer frame applied around this frame.

Other registration control systems are disclosed in U.S. Pat. Nos. 3,915,090, issued Oct. 28, 1975 and 4,018,528, issued Apr. 19, 1977.

DESCRIPTION OF THE INVENTION

Technical Problem

Against the background of this prior art it is found to be an extremely acute problem, on the one hand, to be able to establish the existence of any discrepancy between the reference pattern and a new print and, on the other hand, to be able to carry out a compensation with simple means which results in the new print being applied exactly over the reference pattern or, in any case, being applied within narrow toerance values, say less than 0.1 mm.

With the high demand for high loading of the printing machines which has now become apparent, any measure which can reduce the standstill and setting-up time becomes particularly important.

Although the earlier known method and the earlier known arrangement with a specially constructed printing table, which is provided with a rail constructed with registering means which are displaceable and adjustable via three adjusting elements, the adjustment value of which can be transferred directly to corresponding adjusting elements for the stencil, considerably reduces the adjustment work, it has still been found that the manual adjustment by means of adjusting elements on the printing table was somewhat more complicated than could be expected.

Above all, the adjustment work was found to be so complicated because the adjustment cannot be performed solely via two adjusting elements but requires a complicated cooperation between all three adjusting elements. In addition, it is a question if it can be decided visually if each point of the new print on the transparent material is located exactly over corresponding points of the reference pattern. Different expansions in the stencil under the printing section for the reference pattern and for the transparent material contribute to the difficulties to obtain an exact match.

Considering these circumstances, the prime requirement and the technical problem, therefore, consists in being able to further simplify the adjustment work also with the stencil printing machines described.

Solution

The present invention aims at solving the above-mentioned problem by indicating a method of adjusting the print on a material in relation to a reference pattern. The significant feature of the present invention is a combination of the measures stated below, where certain measures in themselves are previously known in this technical field.

The method of adjusting a print made in a printing machine on a material for substantial correspondence in relation to a reference pattern according to the present invention comprises the steps of:

(a) applying the reference pattern serving as an original to a registering table separate from the printing table and provided with first registering means for registering the reference pattern, the first registering means corresponding to second registering means on the printing machine, (b) scanning the reference pattern formed on the original to locate predetermined marks with at least one scanner, (c) recording position values for the marks obtained from the at least one scanner, (d) applying said print in the printing machine to a material registered by the second registering means in the printing machine, (e) applying the material, printed according to "c", to the first registering means of the registering table, (f) scanning the material which is printed according to "c" to locate marks on the print corresponding to the predetermined marks on the reference pattern with the at least one scanner, (g) recording position values for the marks on the print obtained from the at least one scanner, (h) comparing the position values recorded in "c" and "g", (i) determining any deviation between the marks on the reference pattern and the print with respect to a numerical value and direction, (j) determining displacement values from the determined deviation which values are appropriate for compensating for the deviation to apply a subsequent print substantially exactly to a further material in relation to the reference pattern, and (k) evaluating the displacement values and deriving corresponding adjustment values which are supplied to a plurality of adjusting devices to compensate for the deviation.

The present invention also provides an arrangement for adjusting a print made in a printing machine on a material for substantial correspondence in relation to a reference pattern. The arrangement comprises:

(a) a reference pattern serving as an original applied to a registering table separate from the printing table and provided with first registering means for registering the reference pattern, the first registering means corresponding to second registering means on the printing machine, (b) scanning means for scanning the reference pattern formed on the original to locate predetermined marks, (c) means for recording position values for the marks obtained from the scanning means, (d) a material supplied with the print by the printing machine while the material is registered in the second registering means of the printing machine, said material thereafter being applied to the first registering means of the registering table, (e) said material, which is printed according to "d", is scanned by the scanning means to locate marks on the print corresponding to the predetermined marks on the reference pattern, (f) means for recording position values for the marks on the print obtained from the scanning means, (g) means for comparing the position values recorded in "c" and "f", (h) means for determining any deviation between the marks on the reference pattern and the print with respect to a numerical value and direction, (i) means for determining displacement values from the determined deviation which values are appropriate for compensating for the deviation to apply a subsequent print substantially exactly to a further material in relation to the reference pattern, and (j) a computer for evaluating the displacemnt values and for deriving adjustment values which are supplied to adjustment means to compensate for the deviation to ensure that the subsequent print is applied substantially exactly to the further material.

The aim of both the method and the arrangement is to eliminate the deviation in such a manner that the adjustment value for the existing adjustment means can be given in digital form, or as an alternative, the adjustment values for the adjustment means can be supplied directly to drive motors acting on the adjustment means to take up the adjustment position.

Advantages

The most important advantages connected with the method and arrangement according to the present invention consist in that the adjustment time can be reduced considerably.

Moreover, it must be noted, however, that the discrepancy can be determined by evaluating the output signals from special scanning means. The scanning means can consist of a unit comprising four phototransistors and an associated light-emitting diode, in which arrangement each of the phototransistors is directed toward a reflecting mark in the pattern. This means that identical amounts of reflection and light in all phototransistors indicate an exact registration and no discrepancy, whereas a deviation indicates a discrepancy and the magnitude of the deviation and which phototransistor is indicating the deviation provide the parameters which serve as basis for calculating the absolute value and direction of the discrepancy These signals are fed to a data unit which is able to derive the adjustment value in a simple manner on the basis of the received signals.

It has been known that even an exact adjustment does not always provide a fully satisfactory print with regard to changes in the material (shrinkage in the drying system or picture displacement, later producing expansion in a stencil).

A further advantage of the present invention lies in that coordinates can be supplied by simple means to the data unit, where these constants can provide an automatic compensation for a change in material or an expected picture displacement or expansion in the stencil material.

It is also possible to utilize an optical reading unit provided with hair lines and coupled to two arms disposed at an angle, in which the distance of displacement for the unit is determined with great accuracy in two right-angle coordinates. These values can easily be compared and in this manner the discrepancy between two adjustments can be established. By treating these values mathematically, it is possible to determine which of the adjustment means shall be changed, and to what extent, to compensate fully for the discrepancy found.

SHORT DESCRIPTION OF THE FIGURES

A preferred embodiment characterising features of the present invention will be described in greater detail with the aid of the attached drawing, in which FIG. 1 is a perspective view of a greatly simplified stencil printing machine with associated stencil and with a printing table with reciprocating movement, FIG. 2 is a horizontal view of the adjusting means applied to the front edge of the printing table in accordance with a previously known process, FIG. 3 is a perspective view of a registering table according to the invention, FIG. 4 is a greatly simplified data unit coupled to a control system, FIG. 5 is a material printed with a pattern corresponding to the stencil pattern, FIG. 6 is a schematic view of the proposed embodiment of the scanning means, and FIG. 7 is a schematic view of an alternative embodiment.

DESCRIPTION OF THE PREFERRED EMBODIMENTS

Figure 1:
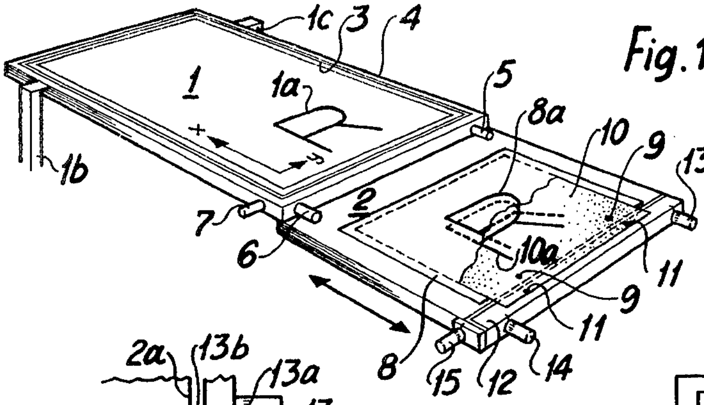
Fig. 1 PRIOR ART
Figure 2:
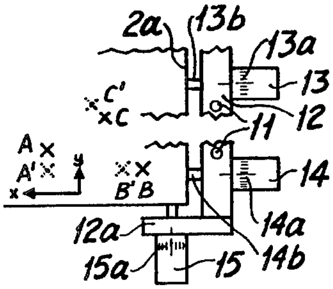
Fig. 2 PRIOR ART

In order to obtain a better understanding of the present invention and the prerequisite conditions, a short report indicating the state of the prior art is provided which is illustrated in FIGS. 1 and 2.

The principle of the invention may be applied to several different printing machines but the description following hereafter is limited to a stencil printing machine with a printing table with reciprocating movement and a stencil which is fixed in a frame which, in turn, is fixed in an outer frame.

The earlier known method of adjusting the position of a stencil 1 relative to the position of a printing table 2 is based on the fact that the stencil 1 is held tensioned in an inner first frame 3 which, in turn, is held by and placed in an outer, second frame 4. The inner frame 3 can be moved to different positions relative to the outer frame 4 by three setting devices 5, 6 and 7. By simultaneously actuating the setting means 5 and 6 equally, the inner frame 3 is moved relative to the outer frame 4 in the direction of the coordinate "x", while actuation of the setting means 7 causes the inner frame 3 to move in the direction of the coordinate "y" relative to the outer frame 4. Different degrees of actuation of the setting means 5 and 6 cause the frame 3 to be twisted in the outer frame 4. By means of this arrangement it is thus possible to adjust each small deviation, irrespective of how it occurs.

The structural design of the setting means 5, 6 and 7 is previously known and does not form any part of the present invention.

The outer frame 4 is capable of being raised and lowered but is, nevertheless, fixed relative to the stand of the printing machine, of which stand only supports **1*b* and 1*c* are illustrated in FIG. 1. The printing table 2 is reciprocably movable but is, nevertheless, fixed relative to the stand 1*b* and 1*c*** of the printing machine.

In the infeed position of the printing table 2 there is applied to said table a material 8 exhibiting a reference pattern **8*a*. The material 8 is provided with a pattern 8*a* which is an exact replica of the pattern 1*a* exhibited by the stencil 1, namely "R". The stencil pattern is designated 1*a* while the pattern of the material 8 is designated 8*a*. The reference pattern 8*a* is fixed relative to the printing table 2 via a plurality of registering means 9. It is an object of the present invention to ensure that the pattern "R" of the stencil 1 obtains an exact position in relation to the pattern "R" on the material 8 during a printing operation. It is here suitable to assume that the stencil pattern 1*a* (R) printed on the material 8 gives a pattern which deviates from the position of the pattern 8*a* (R) and that it is necessary, therefore, to displace the stencil pattern 1*a* in the second frame 4 in such a manner that, when printing, the pattern 1*a* will be placed exactly over the pattern 8*a***.

In order to facilitate this adjustment procedure there is placed over the material 8 having the reference pattern 8*a* a transparent material 10 which, via registering means 11, is fixed relative to and held to the printing table 2. The registering means 11 are placed on a beam 12 joined to the printing table, the nature of which beam will be described in more detail hereinafter.

When the printing table 2 is moved to the printing position, that is to say immediately beneath the stencil 1 and the stencil pattern 1*a* is applied to the transparent material 10, it can be established when moving the table 2 to the infeed position, that is to say the position shown in FIG. 1, whether there is any deviation between the reference pattern 8*a* and the print or pattern which has been obtained from the stencil 1, namely the pattern 10*a*.

In FIG. 1 it has been shown that the deviation necessitates displacement of the print or pattern 10*a* in the direction of the coordinate "y" and also in the direction of the coordinate "x". By displacing the transparent material 10 via setting means 13, 14 and 15, in such a manner that the printed pattern 10*a* is located immediately above the reference pattern 8*a*, the setting position of the setting means 13, 14 and 15 can be read off and a corresponding setting can be transferred directly to the setting means 5, 6 and 7. Naturally, it is a prerequisite that displacement of the transparent material 10 by manoeuvring the setting means 13, 14 and 15 takes place in the same manner as displacement of the stencil 1 in the frame 4 by manoeuvring the setting means 5, 6 and 7. Thus, if the setting means 13, 14 and 15 are graduated in the same manner as the setting means 5, 6 and 7 and the setting means 5, 6 and 7 are set to the graduation measured on the setting means 13, 14 and 15 when the printed pattern 10*a* is located immediately above the pattern 8*a*, the inner frame 3 with the stencil pattern 1*a* can thus be moved by the setting means 5, 6 and 7 in exactly the same manner. Thus, there is hereby ensured an exact relationship of the stencil pattern 1*a* to the reference pattern 8*a*.

FIG. 2 is a horizontal view of the edge surface of the printing table 2 with setting means 13, 14 and 15. The setting means 13, 14 cooperate with the edge surface 2*a* of the table and are arranged to cooperate with a beam 12 carrying the registering means 11 for the transparent material 10. Conveniently the setting means 13 and 14 are rotatably mounted on beam 12 and parts 13*b* and 14*b* provided with screw threads extend into the edge surface 2*a* of the printing table and mesh with a corresponding nut mounted in a groove extending parallel to the edge surface 2*a*, said groove guiding the movement of the nuts in the direction of the "y" coordinate. By actuating the setting means 13 and 14 to an equal extent and in the same direction the transparent material 10 is moved in the direction of the "x" coordinate, while rotation or actuation of the setting means 15, which also cooperates with the beam 12 in the manner described above but via an angled part 12*a*, causes the transparent material to be moved in the direction of the "y" coordinate. This means that if the reference pattern 8*a* has a point located in "A" while the transparent material obtains a corresponding printed point located at "A′" it is only necessary to actuate the setting means 15. If, on the other hand, the reference pattern has a point located at "B" it is necessary to actuate the two setting means 13 and 14 equally in order to move the point "B′" immediately above the point "B". If, on the other hand, the reference pattern has a point "C" while the stencil pattern provides a print on the transparent material 10 at point "C′", it is not only necessary to displace in the "y" direction and "x" direction but also to rotate the transparent material, this being effected by actuating the setting means 13 and the setting means 14, and possibly also the setting means 15.

The present invention provides for a registering table 20 having an upper surface 21 which is intended to accept either a reference pattern serving as the original or a printing pattern, both deisngated by 22. The upper surface 21 is provided with two parallel rails 23, 23*a*. A further rail 24 is arranged to extend between the rails 23 and 23*a* and is guided in these rails in such a manner that the rail 24 continuously assumes a position which is located at right angles to the rails 23 and 23*a*. Two scanning means 25, 25*a* are fixed to the rail 24. These scanning means are arranged to be displaceable along the rail 24 and can be fixed to the rail 24 in any position. The scanning means 25 may be of the type disclosed in U.S. Pat. No. 3,844,651 issued Oct. 29, 1974 to Jackson et al or U.S. Pat. No. 3,844,655 issued Oct. 29, 1974 to Johannsmeier.

The mounting of the scanning means 25 and 25*a* is not shown in detail, nor is the way in which the end parts of the rail 24 cooperate with the rails 23 and 23*a*, but it is assumed that this mounting can take place in a manner known previously in itself.

The registering table according to the present invention is provided with registering means, which correspond to a registering means of the printing machine, in the form of guide pins 26, 26*a*. These can also be shifted along the surface 21 of the registering table in a manner known previously in itself. The guide pins 26 and 26*a* should be placeable into a groove formed in the surface 21. Of course, the guide pins may be replaced by stops.

The feature of the invention is that an original 22 is to be placed on the surface 21 of the registering table and that the registering means 22′ of the original works in conjunction with the registering means 26, 26*a* of the registering table.

As mentioned before, the two scanning means 25, 25*a* are arranged to be displaceable in the x and y direction relative to the surface 21 of the registering table but they can also be locked in any position. The present invention is based on the fact that the scanning means 25, 25*a* scan the reference pattern to locate marks formed on the original 22, of the reference pattern, for example the index markers 22″. This can be done in that the scanning means is made to consist of an optical system having "hair lines" which are placed exactly over the index markers 22″, or to let the scanning means consist of an embodiment described earlier, where the requirement for accuracy is considerably reduced.

After that, the original 22 is removed and, instead, a material with a print is introduced which is produced in the printing machine by being registered in the registering means of the latter, and this material is attached also to the means 26, 26*a*.

The marks 22″ (index markers) formed on this material, which is given the same reference designation as the original, are now scanned by the scanning means 25, 25*a* and it is assumed that there is a deviation of the marks on the print with respect to the marks on the reference pattern. The position values of the marks on the print are recorded and compared to the position values of the marks on the reference pattern. In this way, any deviation can be determined and displacement values can be determined which values are appropriate for compensating for the deviation and for applying a subsequent print substantially exactly to a material in relation to the reference pattern.

This means, therefore, that a certain signal combination is transmitted through a wire 30 from the scanning means 25 and a different or similar signal combination is received from the wire 31. These signals are fed to a data unit 32 which, in a manner known previously in itself, is provided with a fixed memory and with one or more programmable memories and the absolute value and direction of the deviation is determined by means of the program stored in the data unit 32 from the signals received from the lines 30 and 31. The data unit 32 may be a microdator sold by Sattco AB, Solna, Sweden, and designated "4680 Databoard".

Figure 4:
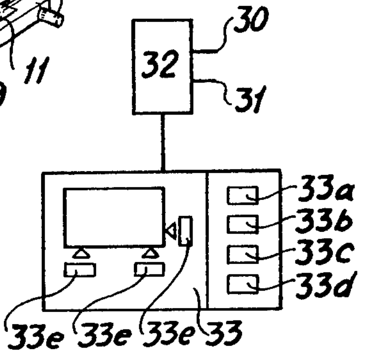
Figure 3:
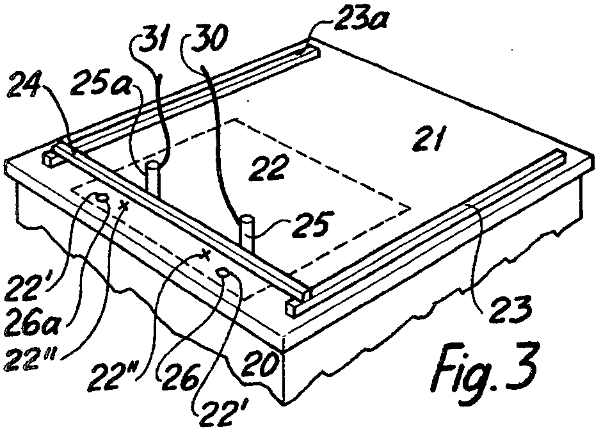

In FIG. 4 also a control unit is shown which will be described later.

Figure 5:
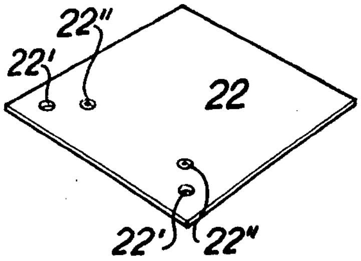

FIG. 5 is a perspective view of the material intended for printing with registering means 22' formed on the latter and index markers 22''.

Figure 6:
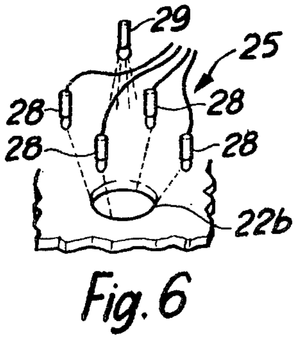

FIG. 6 is a schematic view of the scanning means 25 which consists of a number, normally four, phototransistors 28 and the associated light-emitting diode 29. Each of the phototransistors 28 is directed toward a reflecting part **22*b*. This means that if identical amounts of reflection and light are obtained from the four phototransistors, an exact registration and no discrepancy is indicated, while a deviation indicates a discrepancy. The magnitude of the deviation and which phototransistor 28 is indicating the deviation provide the parameters which serve as basis for calculating the absolute value and direction of the discrepancy in the data unit 32**.

FIG. 4 shows a control unit 33, and after the original is placed on the registering table and the scanning means 25, **25*a* are placed over the mark (index markers) the button 33*a* in the control unit is operated, which means that the data unit 32** executes a so-called "zero adjustment". It is, therefore, not necessary to calibrate the scanning means exactly since any deviation is stored in the data unit as a compensation value.

After that, a printing operation is performed on a material in the printing machine and this print is placed on the registering table. By operating the button **33*b*** the position values determined by the scanning means is now read and the information obtained is processed so that the absolute value and direction of the deviation can be evaluated.

By operating the button **33*c* it is possible to let the adjustment value derived in the computer act on servomotors coupled to the adjustment means (these motors are not shown in FIG. 1**) so that these adjustment means are turned into the correct adjustment position for compensating for the discrepancy.

If on the other hand the button **33*d* is operated, the values derived by the data unit 32 will be displayed on the meters 33, which means that the adjustment means 5, 6 and 7 in FIG. 1** can be turned and will be turned to the set position.

It is also possible to introduce correction factors into the data unit 32, these correction factors being based on changes in the material in the earlier drying process or compensating for picture shrinkage as a result of a stretching in the stencil with the displacement of backing along the stencil.

Naturally, it is possible to use the scanning means to scan parts or index markers in the back edge of the material.

The above-mentioned embodiment was based on the fact that the adjustment takes place by changing the position of the pattern (stencil) relative to the material (or printing table).

In an alternate embodiment, a displacement is imparted to the registering means 11, and the material related to the latter, via the means 13, 14 and 15 and the adjustment is performed by displaceing the material along the printing table.

In another alternate embodiment, it is proposed to regulate the printing table (as well as the frame 3 for the stencil 1) within an outer frame so that the whole printing table with registering means fixed thereto is controllable with respect to the pattern.

In the above description reference was made to a data unit 32 and a computer 33. The elements contained in these parts have not been described in detail since it is clear to an expert in the field, with guidance from the patent specifications provided, how these elements will function together.

Figure 7:
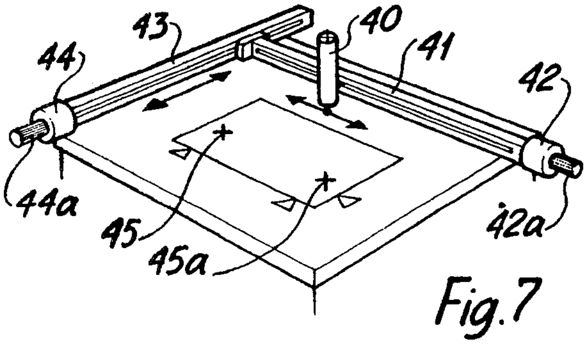

FIG. 7 shows an alternative embodiment. Here an optical reading unit 40 with inbuilt hair lines is illustrated. This unit is displaceable along a measuring scale 41 by means of a drive motor 42. The drive motor 42 can be operated by hand via a wheel **42*a*. The measuring scale 41 is moveably fixed to another measuring scale 43. The measuring scale 41 is displaceable along the measuring scale 43 by means of a drive motor 44. The drive motor can be operated by hand by a wheel 44*a***.

By this arrangement, the unit 40 can be located immediately above a mark 45 of the pattern, either with the aid of the drive motors 42 and 44 or by hand. The data units store the information about the distance of displacement of the unit along the measuring scale 41 and along the measuring scale 43.

After the unit 40 has been moved to the mark **45*a*, the two displacement distances of the mark 45*a* along the scales 41 and 43** can again be read in and stored.

If now a new pattern is to be evaluated, the unit can be displaced in the same manner to corresponding parts and there the current displacement distances can be read and stored. Any discrepancy can be evaluated and the necessary correction can be calculated on the basis of the discrepancy.

In addition, stretching in the stencil can be compensated. It is also possible to select at the second evaluation marks which deviate by a predetermined value from previously evaluated marks and still obtain correction information in a simple manner. The fact is that it is possible, on the one hand, to determine the size of the pattern and, on the other hand, the position of the pattern.

In FIG. 7 a digital measuring system 5041, developed by the firm of Dr. Johannes Heidenhein, P.O. Box 1260, D 8225 Traunreut, West Germany, can be used and can be coupled to data equipment called Data Board 4680 sold by SATTCO AB, Dalvägen 10, S 171 36 Solna, Sweden.

The invention is certainly not limited to the embodiments described above as examples but can be modified within the framework of the concept of the invention.

I claim:

1. A method of adjusting a print made in a printing machine on a material for substantial correspondence in relation to a reference pattern, comprising the steps of:

(a) applying the reference pattern serving as an original to a registering table separate from the printing table and provided with first registering means for registering the reference pattern, the first registering means corresponding to second registering means on the printing machine, (b) scanning the reference pattern formed on the original to locate predetermined marks with at least one scanner, (c) recording position values for the marks obtained from the at least one scanner, (d) applying said print in the printing machine to a material registered by the second registering means in the printing machine, (e) applying the material, printed according to "d", to the first registering means of the registering table, (f) scanning the material which is printed according to "d" to locate marks on the print corresponding to the predetermined marks on the reference pattern with the at least one scanner, (g) recording position values for the marks on the print obtained from the at least one scanner, (h) comparing the position values obtained in "c" and "g";

(i) determining any deviation between the marks on the reference pattern and the print with respect to a numerical value and direction, (j) determining displacement values from the determined deviation which values are appropriate for compensating for the deviation to apply a subsequent print substantially exactly to a further material in relation to the reference pattern, and (k) evaluating the displacement values and deriving adjustment values which are supplied to a plurality of adjusting devices to compensate for the deviation.

2. The method according to claim 1, wherein the adjustment values are in digital form for these adjusting devices.

3. The method according to claim 1, wherein the adjustment values for the three adjusting devices are fed directly to drive motors acting on the adjusting devices in the printing machine.

4. The method according to claim 1, wherein the displacement values are used for changing the position of the print in relation to the material.

5. The method according to claim 1, wherein the displacement values are used for changing the position of the material intended for printing in relation to the print.

6. The method according to claim 5, wherein the displacement values are used for displacing the material along the printing table by displacing the second registering means.

7. The method according to claim 5, wherein the displacement values are used for displacing the printing table, together with a fixed material, in relation to the print.

8. The method according to claim 1, wherein two adjustable scanners are used for scanning the marks.

9. An arrangement for adjusting a print made in a printing machine on a material for substantial correspondence in relation to a reference pattern, comprising:

(a) a reference pattern serving as an original applied to a registering table separate from the printing table and provided with first registering means for registering the reference pattern, the first registering means corresponding to second registering means on the printing machine, (b) scanning means for scanning the reference pattern formed on the original to locate predetermined marks, (c) means for recording position values for the marks obtained from the scanning means, (d) a material supplied with the print by the printing machine while the material is registered in the second registering means of the printing machine, said material being thereafter applied to the first registering means of the registering table, (e) said material, which is printed according to "d", is scanned by the scanning means to locate marks on the print corresponding to the predetermined marks on the reference pattern, (f) means for recording position values for the marks on the print obtained from the scanning means, (g) means for comparing the position values recorded in "c" and "f", (h) means for determining any deviation between the marks on the reference pattern and the print with respect to a numerical value and direction, (i) means for determining displacement values from the determined deviation which values are appropriate for compensating for the deviation to apply a subsequent print substantially exactly to a further material in relation to the reference pattern, and (j) a computer for evaluating the displacement values and for deriving adjustment values which are supplied to adjustment means to compensate for the deviation to ensure that the subsequent print is applied substantially exactly to the further material.

10. The arrangement according to claim 9, wherein the computer evaluates the adjustment values in digital form for three adjusting means.

11. The arrangement according to claim 9, wherein the computer includes means for evaluating the adjustment values and acting on servo motors coupled to the adjustment means.

12. The arrangement according to claim 9, wherein the scanning means includes a plurality of phototransistors and one light-emitting diode.

13. The arrangement according to claim 12, wherein the scanning means includes at least four phototransistors and one light-emitting diode, each of the phototransistors being directed toward a reflecting mark on the original or the print.

14. The arrangement according to claim 9, used for adjusting the position of a stencil in relation to the printing table of a stencil printing machine and a material placed on the printing table, the material being intended to receive a print corresponding to the stencil pattern wherein the stencil is fixed in a frame which is adjustable in an outer frame, the print corresponding to the stencil pattern is applied to the material which is fixed to the second registering means on the printing table of the stencil printing machine, and wherein the adjustment means adjusts the position of the stencil in relation to the printing table.

15. The arrangement according to claim 9, wherein the adjustment means changes the position of the print in relation to the material.

16. The method according to claim 9, wherein the adjustment means changes the position of the material intended for printing in relation to the print.

17. The arrangement according to claim 16, wherein the adjustment means displaces the material along the printing table by displacing the second registering means.

18. The arrangement according to claim 16, wherein the adjustment means displaces the printing table, together with a fixed material, in relation to the print.

19. The arrangement according to claim 9, wherein the evaluation of the adjustment values are related to the first registering means rather than to the marks.

20. The arrangement according to claim 9, wherein the scanning means comprises two scanners which are adjustable in relation to the marks.

* * * * *